US007580697B2

(12) United States Patent
Lappe et al.

(10) Patent No.: US 7,580,697 B2
(45) Date of Patent: Aug. 25, 2009

(54) METHOD AND EMERGENCY CALL DEVICE FOR TRIGGERING AN EMERGENCY CALL FROM A VEHICLE

(75) Inventors: Dirk Lappe, Karlsruhe (DE); Guido Hovestadt, Wickede-Ruhr (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 10/495,350

(22) PCT Filed: Nov. 12, 2002

(86) PCT No.: PCT/EP02/12634

§ 371 (c)(1),
(2), (4) Date: Dec. 30, 2004

(87) PCT Pub. No.: WO03/042943

PCT Pub. Date: May 22, 2003

(65) Prior Publication Data

US 2005/0096007 A1 May 5, 2005

(30) Foreign Application Priority Data

Nov. 12, 2001 (DE) ................................ 101 55 550

(51) Int. Cl.
*H04M 11/04* (2006.01)

(52) U.S. Cl. .................... 455/404.1; 455/466; 455/412; 455/567; 455/41; 455/66; 340/425.5; 340/539.11

(58) Field of Classification Search ................. 455/404, 455/404.1, 404.2, 574, 321, 426.19, 66.1, 455/344, 345, 466, 412; 340/436, 989, 988, 340/983, 636.1, 426, 425.5, 539.11; 701/45
See application file for complete search history.

(56) References Cited

U.S. PATENT DOCUMENTS 5,794,164 A * 8/1998 Beckert et al. ............ 455/3.06
5,890,061 A * 3/1999 Timm et al. .............. 455/404.2

(Continued)

FOREIGN PATENT DOCUMENTS

| | | |
|---|---|---|
| DE | 4421960 | 1/1996 |
| JP | 2001250183 | 9/2001 |
| WO | WO 90/03899 | 4/1990 |

*Primary Examiner*—Charles N Appiah
*Assistant Examiner*—Michael T Vu
(74) *Attorney, Agent, or Firm*—O'Shea Getz P.C.

(57) ABSTRACT

In order to be able to reliably trigger an emergency call from a vehicle with a radio telephone (T), even in the case of a heavy crash or collision, an autonomous emergency call unit (N) is arranged in a position in the vehicle particularly well protected from damage by collision or crash. An emergency call is triggered, for example, by a gyro (K), provided as a crash detector, which activates the emergency call unit (N) in a mechanical manner, which then transmits an emergency call to the radio telephone (T) over a short radio path according to the bluetooth standard for example, which then further transmits the emergency call to an emergency call exchange (Z) over a radio path (F). The autonomous emergency call unit (N) is provided with a bluetooth transceiver unit (BE), a battery (BA), a gyro (K) and a GSM transceiver (GSM) which transmits an emergency call to the emergency call exchange (Z) should the radio telephone (T) be damaged or destroyed.

3 Claims, 1 Drawing Sheet

U.S. PATENT DOCUMENTS

| | | | | |
|---|---|---|---|---|
| 5,914,675 | A * | 6/1999 | Tognazzini | 340/989 |
| 5,953,650 | A * | 9/1999 | Villevieille | 455/404.2 |
| 5,986,543 | A * | 11/1999 | Johnson | 340/426.19 |
| 6,073,004 | A * | 6/2000 | Balachandran | 455/404.2 |
| 6,073,005 | A * | 6/2000 | Raith et al. | 455/404.1 |
| 6,339,370 | B1 * | 1/2002 | Ruhl et al. | 340/436 |
| 6,340,928 | B1 * | 1/2002 | McCurdy | 340/436 |
| 6,675,006 | B1 * | 1/2004 | Diaz et al. | 455/404.1 |
| 6,690,302 | B1 * | 2/2004 | Inomata | 340/989 |
| 6,711,399 | B1 * | 3/2004 | Granier | 455/404.1 |
| 6,721,580 | B1 * | 4/2004 | Moon | 455/574 |
| 6,782,240 | B1 * | 8/2004 | Tabe | 455/66.1 |
| 6,873,837 | B1 * | 3/2005 | Yoshioka et al. | 455/321 |
| 7,034,705 | B2 * | 4/2006 | Yoshioka | 340/636.1 |
| 7,200,409 | B1 * | 4/2007 | Ichikawa et al. | 455/456.1 |
| 2002/0016658 | A1 * | 2/2002 | Imai et al. | 701/45 |
| 2002/0137489 | A1 * | 9/2002 | Dutta et al. | 455/404 |
| 2003/0083079 | A1 * | 5/2003 | Clark et al. | 455/466 |
| 2003/0085805 | A1 * | 5/2003 | Paulo | 340/425.5 |

* cited by examiner

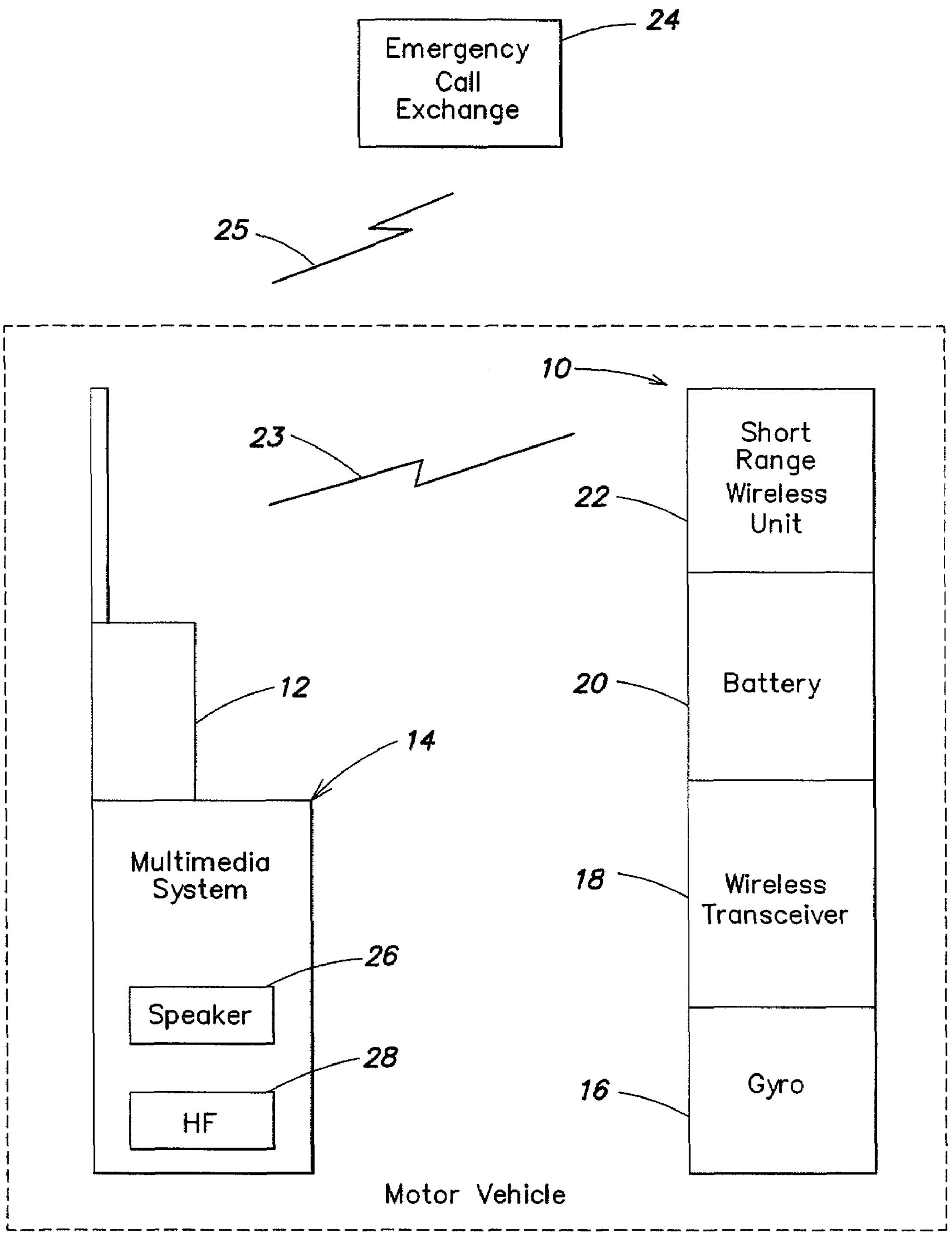
Emergency
Call
Exchange
24
25
10
23
Short
Range
Wireless
Unit
22
12
14
Battery
20
Multimedia
System
18
Wireless
Transceiver
26
Speaker
28
HF
16
Gyro
Motor Vehicle

METHOD AND EMERGENCY CALL DEVICE FOR TRIGGERING AN EMERGENCY CALL FROM A VEHICLE

CLAIM OF PRIORITY

This patent application claims priority to PCT/EP02/12634 filed on Nov. 12, 2002 and German patent application DE10155550.4 filed Nov. 12, 2001.

FIELD OF THE INVENTION

The present invention relates to the field of motor vehicle communication systems, and in particular to a system for initiating and making an emergency call from a vehicle in the event of a collision or impact.

RELATED ART

Motor vehicles often include a multimedia system which, in addition to the classic car radio, comprises modules such as a cassette player, CD player, DVD player, television receiver, navigation system, display screen, loudspeakers, and a car phone equipped with a hands-free device. The individual devices are operably connected, for example, through a common bus line in the form of an optical data bus forming a ring-type network.

A known design involves connecting an emergency call device through an electrical cable or fiber-optic cable to a head unit of the multimedia system. For example, an emergency call button is provided that sends out an emergency call when activated. Also known are automatically functioning emergency call devices that evaluate the electrical control signal of an airbag. The electrical signal triggering the airbag simultaneously triggers an emergency call that is implemented, for example, through the exchange of Short Message Systems (SMS). Alternatively, it is also possible to trigger a conventional telephone call to an emergency call exchange.

A disadvantage of known emergency call devices is that they may be damaged by a collision, thus rendering the emergency call device inoperable at the time it is needed most. Therefore, there is a need for an emergency call device that reliably triggers an emergency call from a vehicle equipped with a radio telephone in response to detecting a collision.

SUMMARY

An emergency call device located within a motor vehicle detects a crash of the motor vehicle and transmits an emergency event signal over a first wireless channel to a wireless telephone also located within the motor vehicle. In response to receiving the emergency event signal the wireless telephone transmits an emergency signal over a second wireless channel. The emergency signal may be transmitted to an emergency call exchange.

The emergency call device is connected to the radio telephone via a wireless link. As a result, there are no interconnecting cables between the emergency call device and the telephone that may be damaged during the collision, thus rendering the system inoperable. The emergency call device functions independently of the on-board electrical system (e.g., the emergency call device operates off battery power that allows the device to continue operating even after the motor vehicle electrical system has been disabled due to the crash). In one embodiment, the wireless transmission between the emergency call device and the telephone occurs over a short range wireless link such as a Bluetooth compatible wireless channel.

In one embodiment, a sensor detects a crash and immediately initiates transmission of an emergency call. For example, the sensor may be a gyro that does not employ electrical signals but rather a mechanical mechanism of triggering an emergency call from the emergency call device to the radio telephone. Because the gyro reacts quickly upon a crash being initiated, the emergency call is transmitted before any damage to or destruction of the radio telephone occurs. The short period between detection of a crash by the gyro and possible damage to or destruction of the radio telephone by the impact is sufficient time for all data relevant to the crash to be transmitted via the Blue-Tooth link. The emergency call may also be triggered, for example, by a triggering signal of the airbag.

The emergency call device may include a GSM transceiver to send out an emergency call upon the detection of a collision. Such a configuration may decrease the amount of time required to send an emergency message since the message is sent directly from the emergency call device, rather than via the radio telephone.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

DESCRIPTION OF THE DRAWING

The invention can be better understood with reference to the following drawing and description. The components in the FIGURE are not necessarily to scale, emphasis instead being placed upon illustrating the principles of the invention.

The FIGURE illustrates one embodiment of the invention.

DETAILED DESCRIPTION

The FIGURE illustrates a block diagram of a motor vehicle emergency call unit 10, a radio telephone 12 and a multimedia system 14. The emergency call device 10 includes a gyro 16 configured and arranged to detect a crash or impact of the motor vehicle, within which the emergency call device 10 is located. The emergency call device 10 also includes a wireless transceiver 18 (e.g., a GMS transceiver), a battery 20 and a short range wireless transmitter 22 such as a Bluetooth unit.

Upon detecting a crash or impact, the gyro 16 provides an indication thereof (e.g., via a mechanical mechanism) to the Bluetooth device 22, which transmits an emergency event signal to the radio telephone 12 via a short range wireless channel 23. In response to receiving the emergency call, the telephone 12 transmits an emergency notification via a wireless channel 25 to an emergency call exchange 24. In addition, if the radio telephone 12 has already been destroyed, the GSM transceiver 18 independently sends out the emergency call to the emergency call exchange 24. The multimedia system 14 may include a loudspeaker 26 and a hands-free device 28 that cooperate to establish a voice connection to the emergency call exchange 24.

The emergency call device is configured and arranged to transmit an emergency call reliably even in the event of a serious collision or crash. The emergency call device 10 is preferably well protected in the event of a crash. The emergency call device may be integrated into a multimedia system of a motor vehicle.

Another approach includes preparing a commercially available radio telephone (cell phone) to receive emergency calls sent by the emergency call unit 10 and relay them to the emergency call exchange 24. An advantage of using a cell phone is the fact that today almost everyone owns and carries a cell phone. If the vehicle-internal radio telephone fails, for example due to a crash, it is still possible to establish a connection to the emergency call exchange through the emergency unit and the cell phone.

Another approach involves having a human operator activate the emergency call unit 10 through the cell phone 12 and trigger an emergency call. The cell phone here then essentially functions as a remote control for the emergency call unit 10.

The illustrations have been discussed with reference to functional blocks identified as modules and components that are not intended to represent discrete structures and may be combined or further sub-divided. In addition, while various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. A multimedia system mounted in a vehicle, comprising:

at least one multimedia device;

a first cellular telephony transceiver that includes a short range non-cellular wireless receiver;

an emergency call device, comprising a sensor that detects a collision of the vehicle and provides a sensor output signal;

a short range non-cellular wireless transmitter that receives the sensor output signal and transmits a collision signal to the first cellular transceiver over a non-cellular wireless channel when the sensor output signal indicates a collision of the vehicle;

a second cellular telephony transceiver; and a battery that provides power to the sensor, the short range non-cellular wireless transmitter and the second cellular telephony transceiver, where when the first cellular telephony transceiver receives the collision signal it transmits an emergency event signal to a device external to the multimedia system, and where when the second cellular telephony receiver receives the collision signal it transmits the emergency event signal to the external device in the event the first cellular telephony transceiver is unable to transmit the emergency event signal.

2. The multimedia system of claim 1, where the short range wireless transmitter transmits the collision signal using a Bluetooth communication format.

3. The multimedia system of claim 1, where the sensor comprises a gyro.

* * * * *